US009009976B2

(12) United States Patent
Seow et al.

(10) Patent No.: US 9,009,976 B2
(45) Date of Patent: Apr. 21, 2015

(54) METHOD AND APPARATUS FOR ENERGY CHAIN INSTALLATION

(75) Inventors: Tiang Keng Seow, Singapore (SG); Kok Seng Wong, Singapore (SG)

(73) Assignee: Keppel Offshore & Marine Technology Centre Pte Ltd, Singapore (SG)

( * ) Notice: Subject to any disclaimer, the term of this patent is extended or adjusted under 35 U.S.C. 154(b) by 0 days.

(21) Appl. No.: 14/235,159

(22) PCT Filed: Jul. 12, 2012

(86) PCT No.: PCT/SG2012/000245
§ 371 (c)(1),
(2), (4) Date: Jan. 27, 2014

(87) PCT Pub. No.: WO2014/011114
PCT Pub. Date: Jan. 16, 2014

(65) Prior Publication Data
US 2014/0332636 A1 Nov. 13, 2014

(51) Int. Cl.
*E21B 19/084* (2006.01)
*H02G 1/00* (2006.01)
(Continued)

(52) U.S. Cl.
CPC .............. *E21B 19/084* (2013.01); *B65G 1/023* (2013.01); *B65G 1/0442* (2013.01); *B66C 13/12* (2013.01); *H02G 3/0475* (2013.01); *H02G 1/00* (2013.01); *H02G 11/006* (2013.01); *F16G 13/16* (2013.01)

(58) Field of Classification Search
CPC ......... B23P 11/00; B23P 17/00; B65G 1/023; B65G 1/0442; B65H 57/16; B65H 57/24; B65H 57/26; F16G 13/16; E21B 19/08; E21B 19/084; B60R 16/0215; F16H 7/18; H02G 11/006; H02G 3/0475; H02G 1/06; B66C 13/12

USPC ................... 29/897, 433, 469, 559, 729, 760; 405/201; 248/51, 52; 191/12 C; 59/78.1; 174/68.3
See application file for complete search history.

(56) References Cited

U.S. PATENT DOCUMENTS 3,779,003 A * 12/1973 Boissevain et al. ............ 59/78.1
5,277,386 A 1/1994 Olsen
(Continued)

FOREIGN PATENT DOCUMENTS

DE 102006026854 * 11/2007 .............. F16G 13/16

OTHER PUBLICATIONS

International Search Report and Written Opinion for corresponding application PCT/SG2012/000245 mailed Feb. 19, 2013, 9 pages.

*Primary Examiner* — David Bryant
*Assistant Examiner* — Matthew P Travers
(74) *Attorney, Agent, or Firm* — Roberts Mlotkowski Safran & Cole P.C.

(57) ABSTRACT

The present invention provides a method and apparatus for installation of an energy chain system onto equipments at an operation site. A base fixture is provided at a preparation site which is independently operable from the operation site. A drag chain assembly and an auxiliary fixture are attached to the base fixture. Cables/hoses required to be installed onto equipments at the operation site are arranged and attached to the auxiliary fixture. The base fixture carrying the drag chain assembly, the auxiliary fixture and the cables/hoses pre-arranged on the auxiliary fixture are then transported to the operation site to enable cable/hose installation and connection to the equipments. The auxiliary fixture is removed upon completion of the cable/hose installation and connection.

12 Claims, 7 Drawing Sheets

(51) Int. Cl.
*H02G 11/00* (2006.01)
*B65G 1/02* (2006.01)
*B65G 1/04* (2006.01)
*B66C 13/12* (2006.01)
*H02G 3/04* (2006.01)
*F16G 13/16* (2006.01)

(56) References Cited

U.S. PATENT DOCUMENTS 6,615,573 B2 9/2003 Blase
6,688,096 B2 2/2004 Wada et al.
7,234,896 B2 6/2007 Donnaly et al.

* cited by examiner

METHOD AND APPARATUS FOR ENERGY CHAIN INSTALLATION

CROSS REFERENCE TO RELATED APPLICATION

This is a US national stage application of PCT/SG2012/000245 filed Jul. 12, 2012, the entirety of which is hereby incorporated by reference.

TECHNICAL FIELD

The present invention relates to a method and an apparatus for energy chain installation. In particular, the present invention relates to a method and apparatus for installation of an energy chain system at an operation side.

BACKGROUND

Energy chains such as electrical power and signal cables, hydraulic and pneumatic hoses are used to connect between an energy supply base at a fixed location, e.g. a power control room, to operational equipments at a movable location/operation site, e.g. a drill floor. In applications such as offshore oil drilling operation, long distance, heavy weight electrical cables and hydraulic/pneumatic hoses are used. Connection and installation of the cables and hoses are carried out before any drilling equipment starts operation. To reduce wear and stress on cables and hoses, prevent entanglement, and improve operator safety, cable carriers such as drag chains are employed together with the cables/hoses.

Conventionally, installation and connection of electrical cables and hydraulic/pneumatic hoses as well as the drag chains are carried out on the site, i.e. the movable location where the equipments consuming the electrical/hydraulic/pneumatic power are located. This type of installation requires a sequential work flow, where time-consuming planning, coordination and monitoring work are required. The workflow typically includes the completion of the construction of necessary infrastructure on selected drill floor, and followed by placement of the drag chain and routing of individual cable/hose in different stages. During the cable/hose installation process, other types of operations/preparations for the equipments are interrupted, and will not be started or resumed until the completion of installation of all the cables and hoses. In addition, any mistake in the routing of a single cable or hose would result in man-hours loss as it is necessary to trace the fault before conducting reworks. Any delay of one of the works will have the accumulated time-delays in the whole rig construction timeline.

In view of the above situation, it would be desirable to provide a method and apparatus to enable cable/hose installation with a better managed time schedule, reduced man-hours and with less interruption on other operations necessary on the site. Such a solution is currently not available.

SUMMARY OF THE INVENTION

According to one embodiment, the present invention provides a method for installation of an energy chain system onto equipments at an operation site. A base fixture is provided at a preparation site which is independently operable from the operation site. A drag chain assembly and an auxiliary fixture are attached to the base fixture. Cables/hoses required to be installed onto equipments at the operation site are arranged and attached to the auxiliary fixture. The base fixture carrying the drag chain assembly, the auxiliary fixture and the cables/hoses pre-arranged on the auxiliary fixture are then transported to the operation site to enable cable/hose installation and connection to the equipments. The auxiliary fixture is removed upon completion of the cable/hose installation and connection.

According to another embodiment, the present invention provides an energy chain installation apparatus for the installation and connection of cables/hoses at an operation site. The apparatus includes a base fixture, a drag chain assembly and an auxiliary fixture attached to the base fixture. Cables/hoses required to be installed and connected to equipment at the operation side are arranged and attached to the auxiliary fixture. The auxiliary fixture is removable from base structure.

DETAILED DESCRIPTION OF PREFERRED EMBODIMENTS

Figure 1:
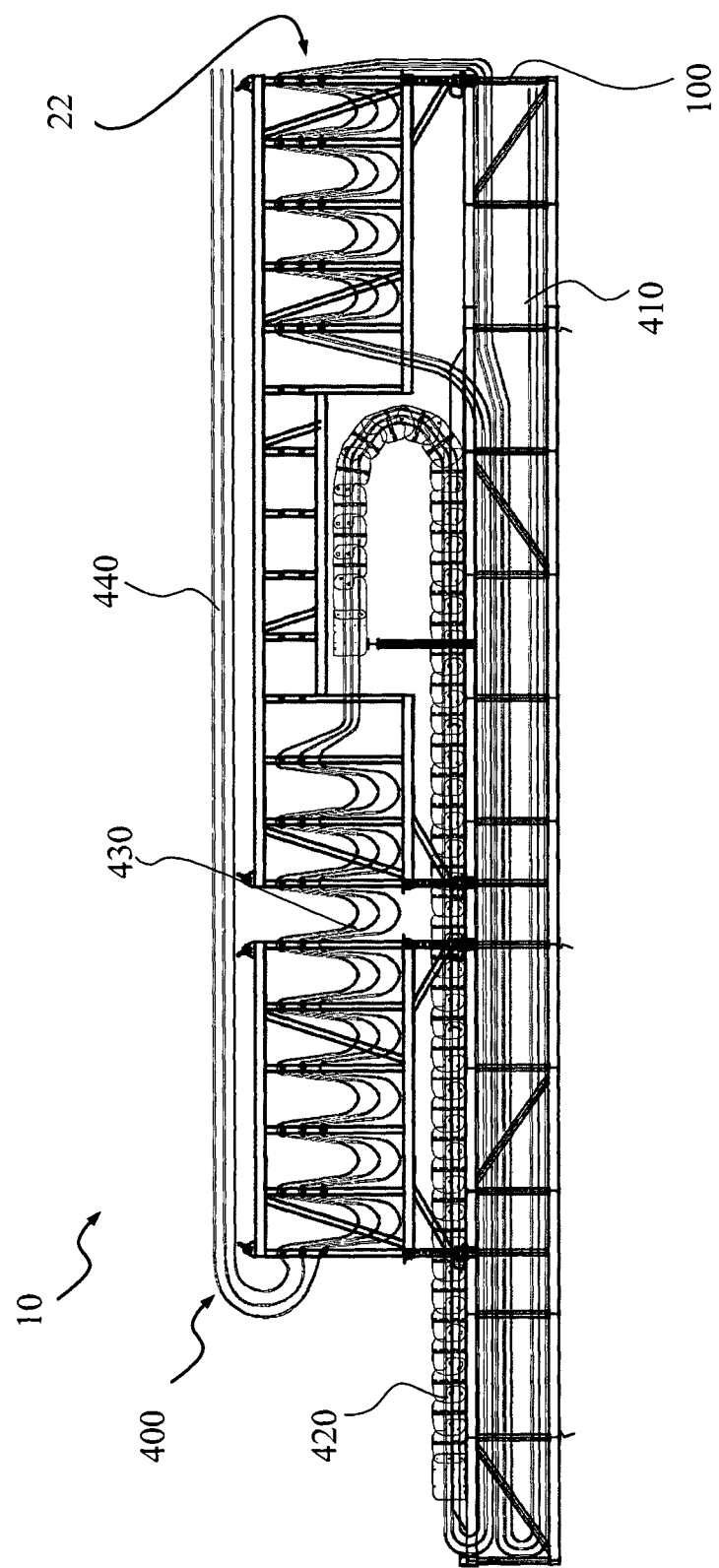
FIG. 1 is a schematic front view showing an energy chain installation apparatus according to one embodiment of the present invention.
Figure 2:
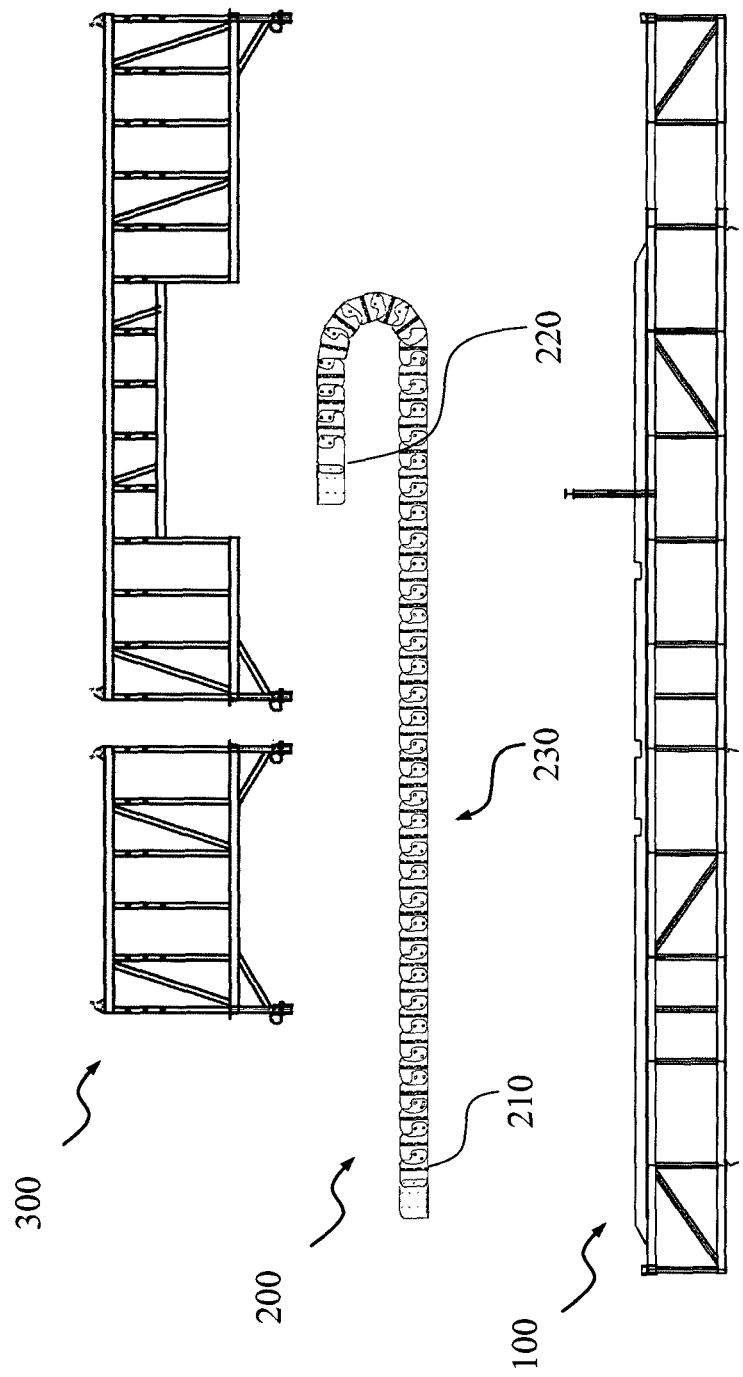
FIG. 2 is a partial exploded view of FIG. 1 with the cables/hoses omitted.
Figure 3:
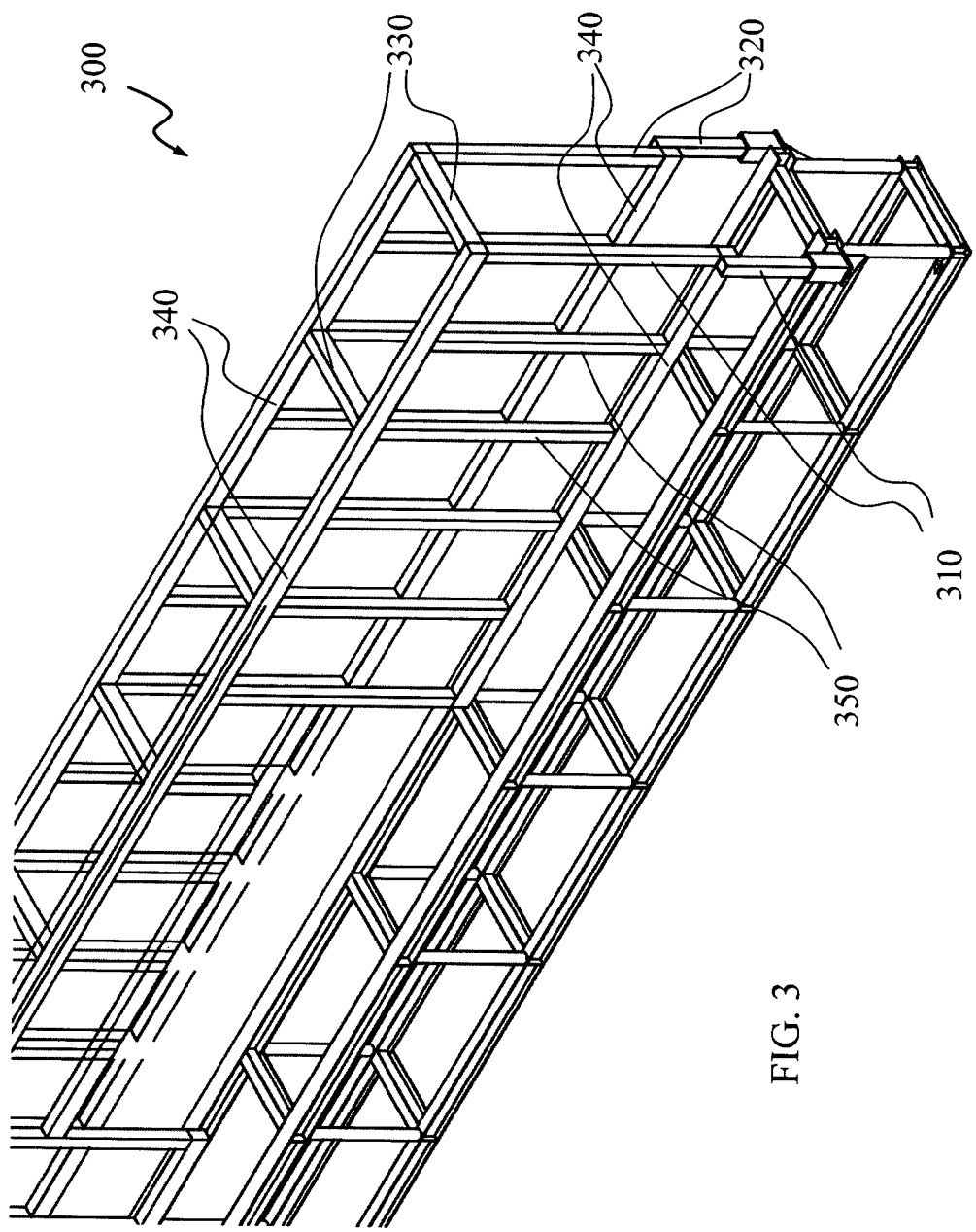
FIG. 3 is a partial perspective view showing an auxiliary fixture of FIG. 1.

As shown in FIGS. 1, 2, 3 and 4, according to one embodiment of the present invention, an energy chain installation apparatus 10 includes a base fixture 100 which is in the form of e.g. a steel frame. Base fixture 100 may be made of formed steel materials such as angle bars, channel bars, I-beams or the like, welded together with sufficient structural strength and rigidity to support other parts of energy chain installation apparatus 10. A drag chain assembly 200 of a predetermined length and cross section, made of a plurality of chain elements, is installed to base fixture 100. A first end 210 of drag chain assembly 200 is fixed to base fixture 100. A second end 220 and the chain elements 230 between first and second ends 210 and 220 are at least partially rested on base fixture 100. Second end 220 and the chain elements 230 are arranged to be free of movement relative to base structure 100.

An auxiliary fixture 300 is secured to and on top of base fixture 100. Auxiliary fixture 300 may also be in the form of a steel frame structure or a truss made of formed steel, by e.g. welding. Auxiliary fixture 300 has a first set of legs 310 at one side, a second set of legs 320 at an opposite side, and crossbars 330 bridging first and second sets of legs 310 and 320 at the top side of auxiliary fixture 300. First and second sets of legs 310 and 320 as well as cross bars 330 are jointed together by longitudinal beams 340 to form the whole frame. Vertical bars 350 may also be added to increase the strength and rigidity of auxiliary fixture 300. Auxiliary fixture 300 is positioned to span over drag chain assembly 200, forming a space 22 between cross bars 330 and drag chain assembly 200.

A cable assembly consisting of one or more cables/hoses, e.g. electrical power supply cables, hydraulic/pneumatic hoses, etc, are arranged to rest on base fixture 100, supported by drag chain assembly 200, and attached to auxiliary fixture 300.

In the present embodiment, auxiliary fixture 300 has one or more support beams 360 detachably fixed to one of more of first and second set of legs 310, 320 as well as vertical bars 350. During the process of cable/hose arrangement, a first segment 410 is laid in base fixture 100, a second segment 420 is received and supported by drag chain assembly 200. A third segment 430 is brought into space 22 and thereafter, support beams 360 are placed underneath cables/hoses 400, and inserted into fixing holes 370 provided on first and second sets of legs 310, 320 as well as vertical bars 350. Once support beam 360 is secured to fixing holes 370, cables/hoses 400 can be allowed to rest on support beam 360 by gravity. Additional support beams may be provided to support more cables/hoses if necessary. Further segment 440 may be folded back to rest on the top side of auxiliary fixture 300.

Figure 4:
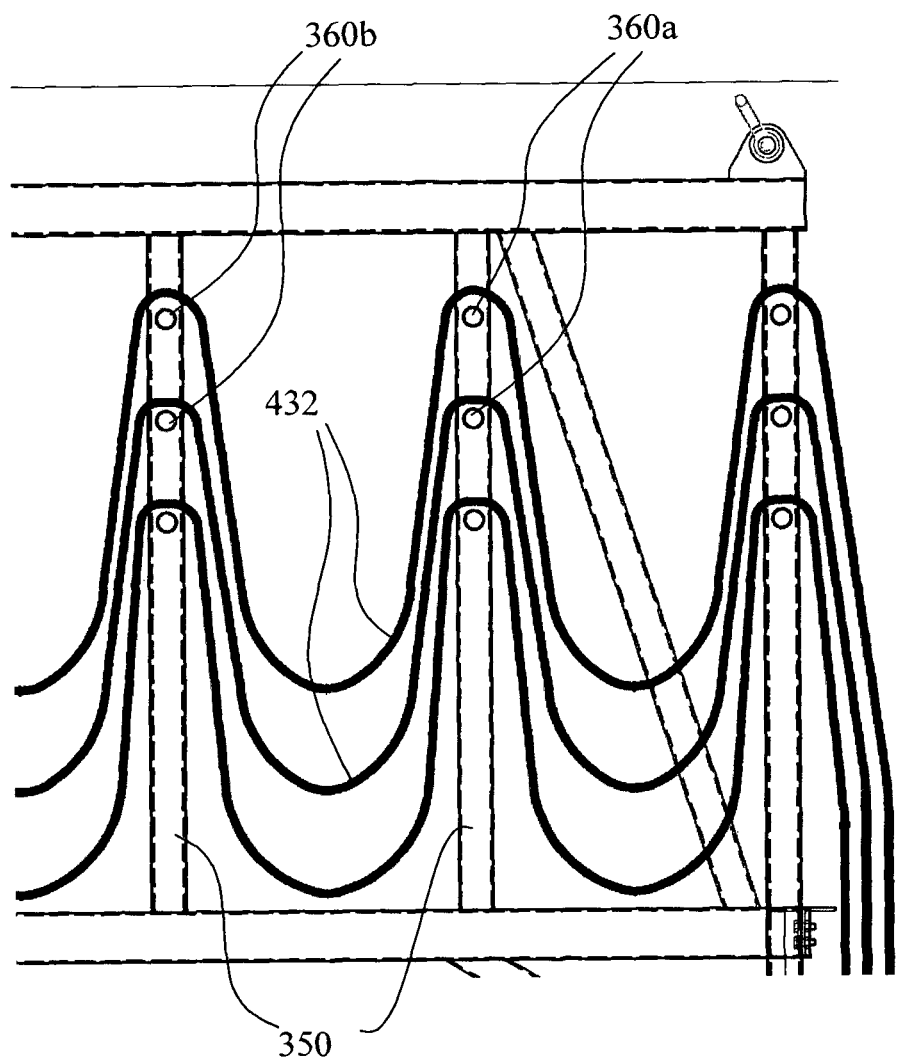
FIG. 4 is a partial enlarged view of FIG. 1.

In applications where longer cables/hoses are required, third segment 430 of cables/hoses 400 may be arranged in auxiliary fixture 300 to rest on the support beams 360 with segments longer than the interval of adjacent support beams 360, i.e. by forming slacks 432 between adjacent support beams 360*a* and 360*b* as shown in FIG. 4. In this regard, cables/hoses 400 with length longer than the maximum external dimension of auxiliary fixture 300 may be arranged and attached to auxiliary fixture 300. Apparatus 100 is now in a condition ready to use when all the parts of cables/hoses 400 are properly arranged thereon.

Figure 5:
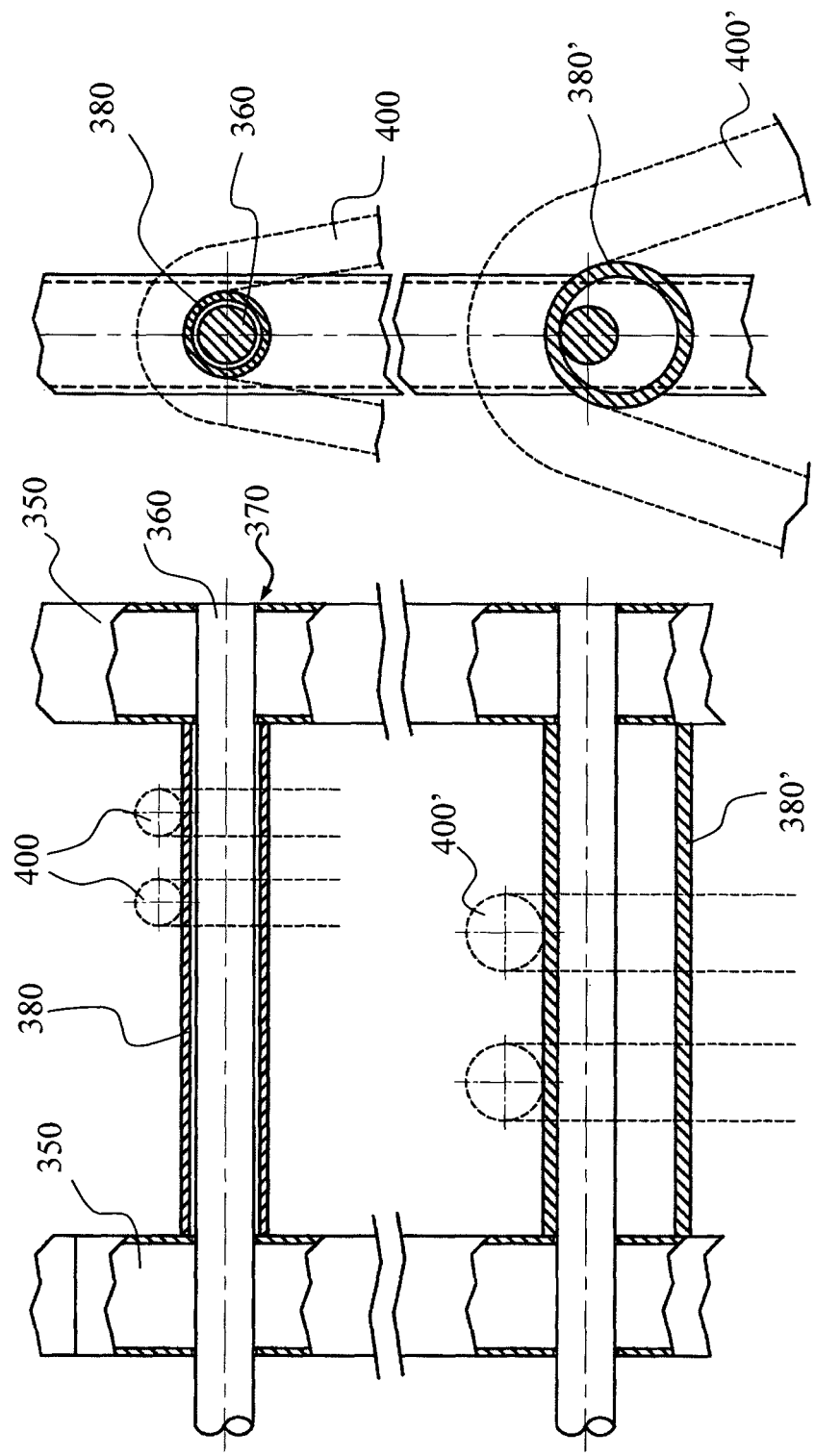
FIG. 5 is an enlarged partial cross sectional front and side view showing support beams of FIG. 1 according to various embodiments of the present invention.

According to one embodiment, auxiliary fixture 300 further includes sleeves 380. Support beam 360, in the form of steel rod, passes through sleeve 380 during the process of cable/hose arrangement and attachment to auxiliary fixture 300. As shown in FIG. 5, sleeve 380 has an inner diameter slightly greater than the external diameter of support beam 360. As such, sleeve 380 is rotatable about support beam 360. Cables/hoses 400 are attached to auxiliary fixture 300 and held by support beam 300, and rest on sleeves 380. Sleeves 380 may be made of plastic, with smooth external surface to allow the cables/hoses to slide on the surfaces of the sleeves. This feature eases the arrangement process of the cables and hoses, and also reduces the risk of cable/hose damage and/or wearing. In addition, sleeves with different external diameters may be used. Sleeves 380 with relatively small external diameter are used to support cable 400 which has a high degree of flexibility and with a smaller minimum allowable bending radius. Sleeve 380' with relatively larger external diameter is used to support cable 400' which has a relatively low level of flexibility and/or larger minimum allowable bending radius.

Figure 6:
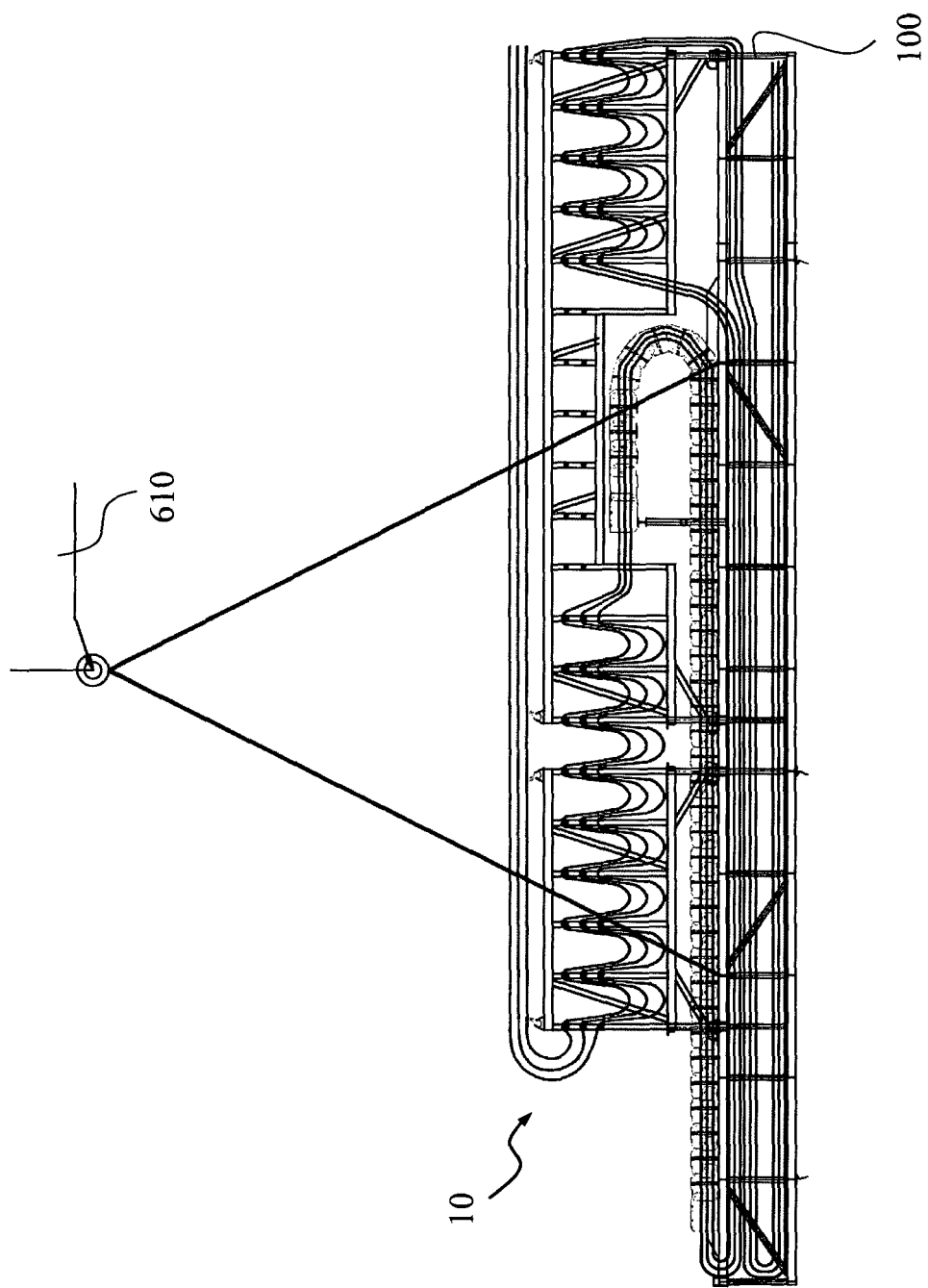
FIG. 6 is a schematic front view showing an energy chain installation apparatus of FIG. 1 in a transportation status.

When it is desired to install the cables/hoses and the drag chain at a movable/operation location, e.g. at a drill floor site, apparatus 10 may be transported to the drill floor, by lifters 610, cranes, trucks or the like (FIG. 6), with base fixture 100 placed at predetermined location of the drill floor site. Cables/hoses 400 can now be released from auxiliary fixture 300. Slacks 432 may be stretched to obtain extended length suitable for proper placement of the cables/hoses and connection to local electrical room located near the equipments where the electrical/hydraulic/pneumatic power is consumed. Release of cables/hoses 400 may be done by progressively removal of support beams 360 from auxiliary fixture 300. When all the cables/hoses are released from auxiliary fixture 300 and connected to their respective connection points, auxiliary fixture 300 may be detached from base fixture 100 and removed from the drill floor site for future use.

Figure 7:
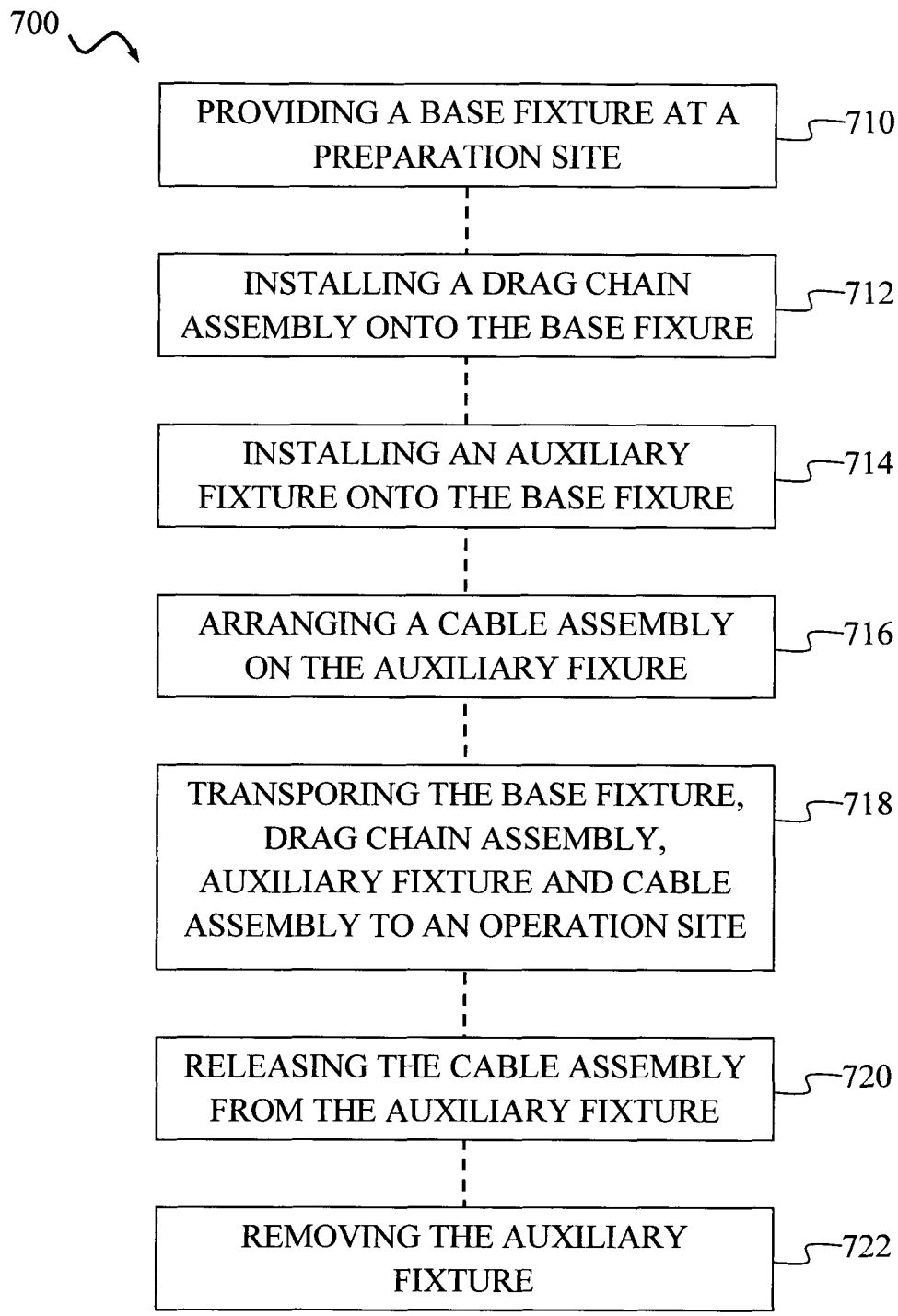
FIG. 7 is a flow chart showing a method for installation of an energy chain system according to one embodiment of the present invention.

FIG. 7 is a block diagram 700 illustrating a method for installation of an energy chain system at a movable location e.g. an operation side, according to an embodiment of the present invention. At block 710, a base structure is provided at a preparation site which is independently operable from the operation site. Such preparation site may be on a ground, a workshop or a factory environment where cable arrangement and laying out can be carried out independently and without interruption to any process and schedule for operations to be conducted at the moveable location.

At block 712, a drag chain assembly is installed onto the base structure. Thereafter, at block 714, an auxiliary fixture is installed onto the base structure and spanning over the drag chain assembly. Subsequently, at block 716, electrical cables, hydraulic/pneumatic hoses are laid out on the base structure, the drag chain assembly and arranged to attach to the auxiliary structure. Completion of the installation method by this step forms an energy chain apparatus for the installation of cables/hoses at an operation site.

When it is desired to install the cables and drag chain at the operation site, as shown in block 718, the base fixture, the drag chain assembly, the auxiliary fixture and the cables/hoses are transported together to the operation site. Cables/hoses are then released (block 720) from the auxiliary fixture, and are connected to their respective connection points to complete the cable installation process at the operation site. Thereafter, at block 722, the auxiliary fixture is detached from the base fixture, and removed from the movable location.

With the apparatus and method provided by embodiment of the present invention, sequential work required for arrangement and installation of cables/hoses at the movable location is eliminated. Instead, these operations are carried out at a separate location which does not interfere or interrupt any operation at the operation site. The operation site is freed up to carry out other operations or preparations without the need of waiting for the cable/hose installation as it is used to be. Valuable man-hours necessary for the whole installation process are greatly saved.

The invention claimed is:

1. A method for installation of an energy chain system at an operation site, the method comprising:
providing a base fixture at a preparation site independently operable from the operation site;
installing a drag chain assembly onto the base fixture;
installing an auxiliary fixture onto the base structure;
arranging a cable assembly including at least one cable on the auxiliary fixture;
installing a first support beam to the auxiliary fixture and resting the at least one cable on the first support beam;
prior to installing the first support beam to the auxiliary fixture, passing the first support beam through a first sleeve to attach the first sleeve to the auxiliary fixture, wherein the at least one cable is rested on the first sleeve;
transporting the base fixture, the drag chain assembly, the auxiliary fixture and the cable assembly to the operation site;
releasing the cable assembly from the auxiliary fixture;
removing the auxiliary fixture.

2. The method of claim 1, further comprising installing a second support beam to the auxiliary fixture and resting the at least one cable on the first and the second support beams, wherein the at least one cable forms a slack between the first and the second support beams.

3. The method of claim 1, further comprising, prior to removing the auxiliary fixture, removing the first support beam from the auxiliary fixture to release the at least one cable.

4. The method of claim 1, further comprising sliding the at least one cable on the sleeve during arranging a cable assembly on the auxiliary fixture.

5. The method of claim 1, further comprising passing a second support beam through a second sleeve and installing the second support beam and the second sleeve to the auxiliary fixture, wherein the first and the second sleeves have a same inner diameter and different external diameters.

6. An energy chain installation apparatus comprising:
a base fixture;
a drag chain assembly attached to the base fixture;
an auxiliary fixture attached to the base fixture;
a first support beam attached to the auxiliary fixture;
a first sleeve through which the first support beam is disposed;
a cable assembly attached to the auxiliary fixture and disposed to rest on the first support beam;
wherein the auxiliary fixture is removable from the base fixture; and
wherein the first support beam and the first sleeve are attached to the auxiliary fixture, and the cable assembly is disposed to rest on the first sleeve.

7. The method of claim 6, further comprising a second support beam attached to the auxiliary fixture, the second support beam being spaced apart from the first support beam, wherein the cable assembly is disposed to rest on the first and second support beams.

8. The apparatus of claim 7, wherein the cable assembly forms a slack between the first and second support beams.

9. The method of claim 6, wherein the first sleeve is rotatable about the first support beam.

10. The method of claim 6, wherein the cable assembly is slideable on the sleeve.

11. The method of claim 6, further comprising a second sleeve and a second support beam passing through the second sleeve, the second support beam and the second sleeve being attached to the auxiliary fixture, wherein the cable assembly is disposed to rest on the first sleeve and the second sleeve.

12. The apparatus of claim 11, wherein the first and the second sleeves have a same inner diameter and different external diameters.

* * * * *